Feb. 15, 1966  B. BERNIER  3,235,277
COLLET CLOSING MECHANISM
Filed April 4, 1963  4 Sheets-Sheet 1

INVENTOR.
BAYNE BERNIER
BY Kenwood Ross
ATTORNEY.

Feb. 15, 1966   B. BERNIER   3,235,277
COLLET CLOSING MECHANISM
Filed April 4, 1963   4 Sheets-Sheet 2

INVENTOR.
BAYNE BERNIER
BY Kenwood Ross
ATTORNEY.

INVENTOR.
BAYNE BERNIER

Feb. 15, 1966 B. BERNIER 3,235,277
COLLET CLOSING MECHANISM
Filed April 4, 1963 4 Sheets-Sheet 4

INVENTOR.
BAYNE BERNIER
BY Kenwood Ross
ATTORNEY.

United States Patent Office 3,235,277
Patented Feb. 15, 1966

3,235,277
COLLET CLOSING MECHANISM
Bayne Bernier, 30 Lovers Lane Road,
Greenfield, Mass.
Filed Apr. 4, 1963, Ser. No. 270,739
2 Claims. (Cl. 279—51)

This invention relates to improvements in a collet closing mechanism which is designed for application upon any screw machine using a draw bar spring type of collet.

As is known, the collet is a type of chuck, extensively used on machines of the type here envisioned, and includes a tapering or conical end which fits into a spindle seat of corresponding taper. The tapered end is split to provide yieldable gripping jaws and a lengthwise movement of the collet causes a contraction or expansion of the gripping jaws. The leading end of the work is advanced through the expanded collet jaws a measured length and the jaws are then caused to be clamped about the work by virtue of a translation of the collet and a cooperant collet draw bar serving to cause the tapered head of the collet to be impinged upon the seat of the spindle. Following clamping, a feed tube is retracted rearwardly relative to the collet draw bar and to the work and along said work a predetermined distance for obtaining a new grip thereon, said distance being according to the length of the work next to be advanced and to frictionally advance the work through the jaws of the collet when next open.

Some collet chucks are closed by a backward pull, and others by a forward push, the movement for closing depending upon the inclination of the taper. Whereas the collet referred to herein will be of the "draw in" type, it will be understood that collets of the "push out" type may be readily substituted therefor by the use of adapters fitted on the spindle head and formed with reverse tapers in the throats thereof.

The instant invention comprehends the provision of an improved cam-operated collet closing means, capable of effectuating the collet closing movement smoothly and efficiently and without undue lost motion, and having a capacity for yielding under the thrust imposed thereon when an undersize or oversize work piece is employed therewith.

The collet jaws are closed on the work by the rearward movement of the collet draw bar, the rearward movement being effectuated by a novel means which retracts the collet draw bar and then releases it, with the forward movement of the collet draw bar being effected by a separate means, which may be spring-actuated or otherwise.

A further salient object of the invention resides in the provision of a device which is sensitive of operation, capable of ready adjustment, and susceptible of economic manufacture.

One embodiment of the invention is shown by way of example in the accompanying drawings wherein certain components not forming a part thereof are illustrated in somewhat stylized and greatly-abbreviated form.

Figure 1:
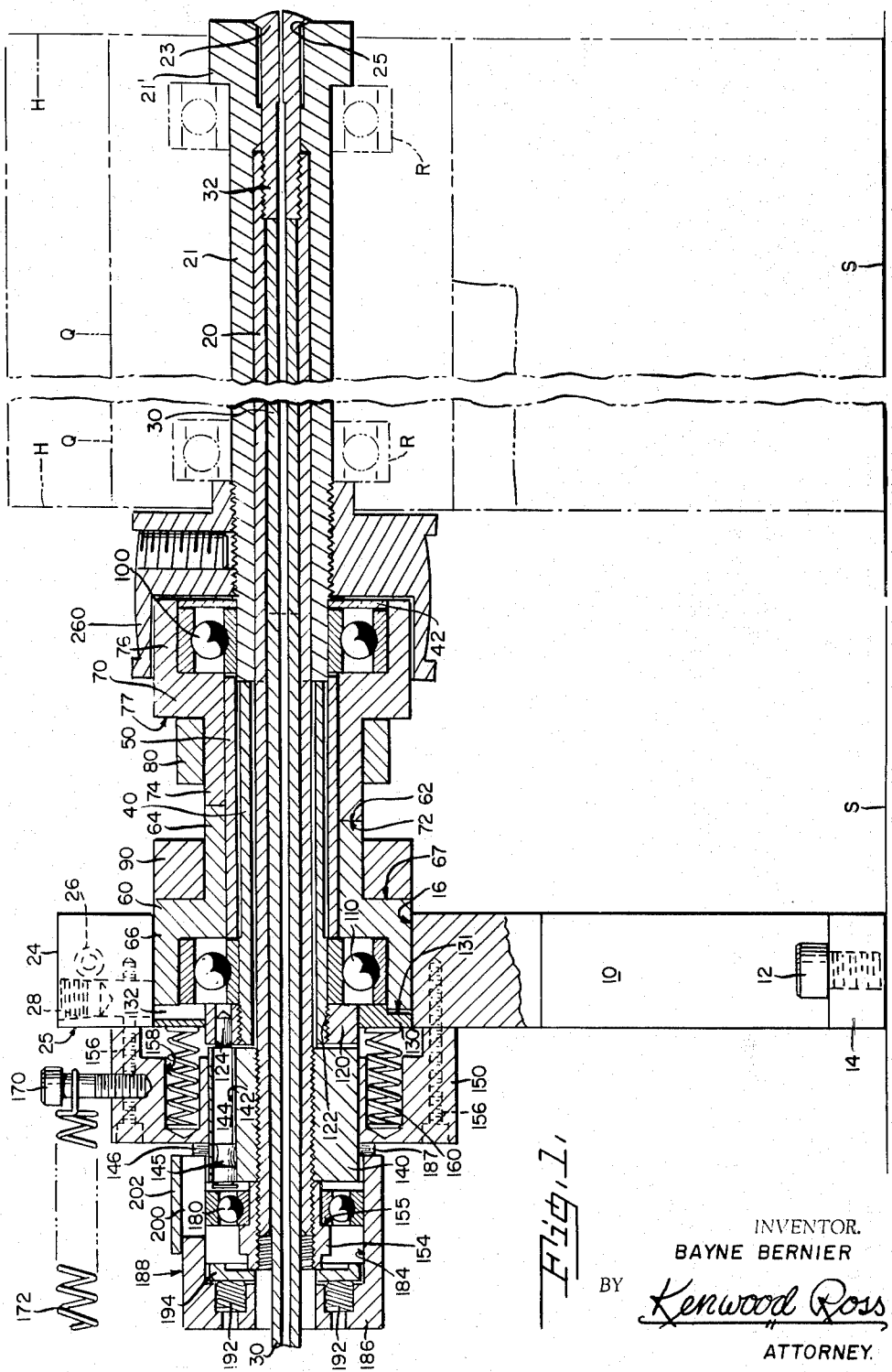
FIG. 1 is a fragmentary longitudinal vertical sectional view showing the instrumentalities of the collet closing assemblage of the invention as employed in a machine, such as an automatic screw machine.

As aforesaid, the construction hereof may be used on any automatic screw machine using a draw bar spring type of collet. Said collet 23 comprises a tube allowing a forwardmost head of generally conical shape with a pair of rearwardly-extending splits arranged diametrically at right angles to each other in manner to provide resilient gripping jaws and being at its rearward end threaded to or integral with the forward end of a collet draw bar 20, which collet and collet draw bar are rotatably-supported within a spindle 21 having a conically-recessed forwardmost head 21', the conical recess being complemental to the conical head of the collet for the accommodation of same when and as the collet and collet draw bar are translated in what will be henceforth identified as a rearward and/or retrograde rectilinear direction. Said spindle, in turn, is rotatably mounted by bearings journalled within a suitably-supported quill Q and driven as by a spindle driving pulley 260 mounted aft of the quill with a spindle-rotating-belt (not shown) entrained therearound, said pulley being threadedly engaged with said spindle.

The rotative movement of the spindle is translated to the collet and collet draw bar, wherefore the collet and collet draw bar and a feed tube 30, mounted concentrically therewithin for rotation therewith and longitudinal reciprocating movement therewithin, are rotated unisonly at a high rotational speed.

With the collet disposed forwardly of the spindle head and with the gripping jaws thereof distended, the collet is ready for the work-advancing-therethrough movement by means of said feed tube which is adapted frictionally to engage the work so as to advance same through the collet jaws responsive to a spring-actuated or equivalent feed finger advancing means associated with the feed tube.

A small longitudinal retrograde movement of the collet draw bar and collet is sufficient to serve to draw the head of the collet into the recess in the spindle head to achieve a closing of the collet jaws upon the work. It is to such collet closing function that the instant invention is primarily directed.

In the instant invention, devices for effectuating a collet closing movement are greatly improved, albeit simplified, it teaching improved means so actuated as to draw the collet rearwardly and hence the collet jaws into the conical recess of the spindle head, thereby to close said jaws upon the work. Following said closing or clamping of the collet jaws, retracting means are rendered operative to draw the feed tube rearwardly within the collet draw bar and along and relative to the work for obtaining a new grip thereon.

Cam means are employed for effectuating retrograde linear movement of the collet draw bar and collet relative to the spindle to achieve the collet closing function, with other means being employed for effectuating an opposite linear collet-opening movement to achieve a releasing of the collet jaws and a restored forward non-operation position.

For the sake of orientation let it be assumed that the various major groups of elements of the screw machine, such as the driving gear group, would be located on the left, and such as the work operating group, would be located on the right, as would be viewed in FIG. 1.

Herein, the most, if not all, of such components are preferentially, though not obligatorily, enclosed within a metal fabricated housing or housings and supported upwardly of a supporting structure or base, denominated herein by the symbol S.

As known, an electric motor (not shown) or equivalent will serve to drive the spindle and other instrumentalities of the machine relatively to each other through the means of suitable belts and pulleys and related gear trains and, of course, at the desired operating speeds.

With this preliminary introduction in mind, the collet closing assemblage of the invention will now be considered, it being explained in advance that the axis of rotation of the work supporting spindle may be disposed forwardly of and co-axial with the axes of rotation of the collet draw bar and collet, and may be parallel to, but not co-axial with, the axis of rotation of the screw machine cam shaft (shown fragmentarily in certain of the figures) with which it is intergeared. Understandably, however, the invention is not limited to this precise arrangement, since the axes of the spindle and collet and collet draw bar may be arranged in any of a number of positions relatively to the cam shaft, according to the type of screw machine under consideration at a given moment.

A collet assembly bracket or upright 10, of generally rectangular shape in plan, is supported transversely of the machine upon supporting structure S, upon which the machine with which the invention is incorporated may rest, and if desired, same may be stationarily secured thereto, as by bolts 12 extendable through suitable openings in unitary legs 14 provided at the base of upright 10.

Essentially, upright or collet assembly bracket 10 comprises a vertically-extending post member having a transverse, central, large-diameter opening 16 extending therethrough at the midsection of its upper portion and coaxial with collet draw bar 20 which is extendable therethrough centrally thereof. A transverse vertically-disposed slot 22 extends between the top planar face 24 of the upright and the central opening for allowing a relative tightening or loosening of the provided bifurcations by the conventional means of a tightening bolt 26 receivable in suitably aligned openings in said bifurcations wherewith various components receivable in the central opening and to be delineated may be tightly secured relative to the upright upon assembly.

A lubricant port 28 is provided in upright 10, leads from top planar surface 24 to opening 16, and is suitably machined to allow threaded reception therein of a nipple (not shown) which will be suitably connected to a flexible lubricant line (also not shown) in conventional manner.

Said collet draw bar 20 is an elongated, horizontally-extending cylindrical tube-like member, which projects rearwardly from within spindle 21, is extendable through opening 16 of upright 10, and is adapted at its forward extremity to be threadedly engaged with or otherwise secured to the rearward end of a collet 23. If desired, said collet may be formed integral with the collet draw bar.

As is known, said collet 23 and collet draw bar 20 are supported within the spindle 21 for both rotational and longitudinal movements. The spindle will be understood to have at its forward end the head 21' in which there is a conical or tapered recess 25 for receiving the oppositely-tapered collet head, the spindle in turn being rotatably mounted within bearings R, herein shown in phantom, seated in appropriate recesses within a quill, also shown in phantom and designated by Q, said quill being supported in a suitable opening in a headstock, represented in phantom by H, and secured to supporting structure S.

Said collet draw bar 20 attains its driving power from the aforedescribed spindle 21.

Collet draw bar 20 is encircled by and telescopically-received within, intermediate its forward and rearward extremities, a concentrically-related cylindrical collet adjusting sleeve 40, the forwardly-facing end of which sleeve is provided with a pair of forwardly-projecting male ends 41 which are matched in corresponding grooves or female keyways 27 extending inwardly from the rearwardly-facing end of the spindle for receiving its driving power therefrom and movement rectilinearly relative thereto.

Sleeved within collet draw bar 20 is the feed tube 30, the forward extremity of which abuts the rearward end 32 of the coaxially-aligned collet 23.

The rearward extremity of feed tube 30 extends rearwardly beyond the rear extremity of collet draw bar 20 for interengagement with a feed tube retracting means (not shown) for retracting said feed tube in a retrograde loading direction and with a feed tube forward motivating means for effecting movement of the feed tube in a forward feeding direction.

A cylindrical collet cam sleeve 50, concentric with collet adjusting sleeve 40, is sleeved therearound or telescopically-engaged therewith, intermediate the length thereof.

A left-hand collet closing cam 60 and a right-hand collet closing cam 70 are each of the face cam type and have milled face cams 62 and 72 respectively on the confronting or contiguous end surfaces of their hubs or barrels 64 and 74 respectively and cooperate so as to be quickly and easily coupled with each other, or disconnected, as occasion demands, and as will appear.

The cams 60 and 70 are shaft-carried by virtue of said hubs 64 and 74 respectively, which hubs are each provided with transverse openings therethrough for sleeving upon collet cam sleeve 50 in manner whereby said cams are coaxial as to each other. Said right-hand collet closing cam is disposed forwardly therealong relatively to said left-hand collet closing cam, said left-hand collet closing cam being mounted as by a running fit upon collet cam sleeve 50, and said right-hand collet closing cam being rotatable upon said collet cam sleeve.

Additionally, each said collet closing cam is provided with an enlarged annular bearing-receiving housing extending outwardly from and coaxial with its respective hub, same being numbered 66 in the case of left-hand collet closing cam 60 and 76 in the case of right-hand collet closing cam 70, with said bearing-receiving housings being oppositely-facing as to each other.

In the case of each end surface of each hub 64 and 74, a step portion A of its total area is disposed in a plane angularly related to and extending forwardly of the normal vertical plane of the end face and a step portion B of its total area is disposed in a plane angularly related to and extending rearwardly of the normal vertical plane of the end face, said angular step portions A and B connecting with each other at the said normal vertical plane of the end face at one side of the end face, delineated by C, and being interconnected at the diametrically opposite side of the end face by a step, delineated by D, said step D extending parallel to the respective hub axis, wherewith the pair of the end faces of the pair of collet closing cams are conjugate cam means to allow an interlocking relationship therebetween, the following action being in a plane generally perpendicular to the axes of the rectilinear movements of the cams. It is to be understood that the angle or pitch of each of the portions A and B may be varied so that the speed of the functioning of the cooperant collet closing cams may be varied according to the requirements of a specific installation.

As the right-hand collet closing cam is rotated into interlocked collet-closing position relative to the left-hand collet closing cam, step portion A of the former is brought into contacting engagement with step portion B of the latter until the steps D of the pair are brought into confrontation with each other so as to interlock the two collet closing cams.

The outer peripheral surface of hub 74 of right-hand collet closing cam 70 is supported within the central transverse opening of an annular, ringlike collet opening yoke 80 in manner whereby the collet opening yoke, releasably secured to said cam by means to be described, is disposed adjacent the contiguous rearwardly-facing outer wall 77 of the annular bearing-receiving housing 76 of the cam and the outer peripheral surface of hub 64 of left-hand collet closing cam 60 is supported within the central transverse opening of an annular, ringlike, collet closing lock ring 90 in manner whereby the collet closing lock ring is disposed adjacent the contiguous forwardly-facing outer wall 67 of the associated annular bearing-receiving housing 66 of the cam, said collet closing lock ring being locked to said hub as by a locking pin 91 whereby rotation of the left-hand closing cam is precluded.

The forwardly-facing end face of collet cam sleeve 50 is disposed in the vertical plane defined by the vertically-disposed inner face of bearing-receiving housing 76 of right-hand collet closing cam 70 in manner to allow snug reception within said bearing-receiving housing of a thrust bearing 100, the inner race of which bears upon the forward end portion of collet adjusting sleeve 40, and there being an annular retainer plate 42 suitably nested within said bearing-receiving housing to retain the bearing in situ and to confine the provided lubricant therefor.

Collet opening yoke 80 is radially slotted at 81 at one side thereof to provide yieldable confronting upper and lower free ends which may be held in varying degrees of adjacency as to each other as by a bolt 106 threadedly engaged in aligned openings arranged in a chordlike manner through said free ends and may be adjusted to any desired degree of tightness upon right-hand collet closing cam 70, the hub of which it circumscribes, so that as it is rotated, as will appear, the cam rotates therewith.

Diametrically opposite the radial slot 81, a radially-extending yoke pin opening 108 therethrough is provided, for purposes hereinafter to be referred to.

The large outside diameter of left-hand collet closing cam 60, defined by the outer peripheral surface of bearing-receiving housing 66, is fitted through the forward face of and within opening 16 of collet assembly bracket 10, there being received within said bearing-receiving housing, a bearing 110, the inner race of which bears upon the rearward end portion of collet adjusting sleeve 40. The rearwardly-facing end face of collet cam sleeve 50 is disposed in the vertical plane defined by the vertically-disposed inner face of bearing-receiving housing 66.

A ringlike collet adjustment disc 120, having a central transverse opening 122 extending therethrough, is disposed concentrically around, and in telescoping and threaded arrangement with, the rearward end portion of collet adjusting sleeve 40 in manner such that its forward face is contiguous with the rearward side face of the inner race of bearing 110. Said collet adjusting sleeve thereby offers a retaining cap for bearing 110 so to effectuate the locked retention of the bearing within its bearing housing and the rearward rectilinear movement of the collet adjusting sleeve as the left-hand collet closing cam 60 and its supported bearing 110 are motivated rearwardly, as will appear.

Concentrically related to and sleeved around collet adjustment disc 120, a ringlike left-hand collet cam thrust plate or collar 130 is provided and is of a diameter to allow its snug-fitting reception within opening 16 of collet assembly bracket 10, with its rearward face being flush with the rearwardly facing vertically-disposed face 25 of collet assembly bracket 10.

Collar 130 is formed to allow a forwardly-facinug annular peripherally-arranged recess 131 serving as a seat for the nesting therewithin of the complementally-configured annular rearwardmost end portion of bearing housing 66 of left-hand collet closing cam 60, all in the manner of a pair of complementary interdigitating annular ribs.

Collar 130 is further configured to allow, at the upper sector thereof, a forwardly-facing radially-disposed cut-out or recess 132 which will permit the lubricant admitted to the structure through lubricant port 28 to gain ready access to bearing 110.

As its very nomenclature implies, left-hand collet cam collar or thrust plate 130 serves to compensate for any thrust directed rearwardly against the left-hand collet closing cam during operational use.

Said collet adjustment disc 120 is additionally provided with a multiplicity of circumferentially-arranged equi-angularly disposed spacer openings 124 extending transversely therethrough which are adapted to receive, in seriatim, the forward end portion of a forwardly-facing collet adjustment pin, as will be subsequently observed.

Rearwardly of collet adjusting sleeve 40 and collet adjustment disc 120 and circumadjacent collet draw bar 20 so as to be contiguous with collet adjustment disc 120, a ringlike collet adjustment pin block 140 is provided. Same is threadedly engaged with said collet draw bar. Collet adjustment pin block 140 has a horizontally-disposed collet adjustment pin opening 142 extending transversely therethrough, the opening being coaxially-alignable in seriatim with each of the spacer openings 124 in collet adjustment disc 120, when and as said collet adjustment pin block 140 is manually rotated in a clockwise or counterclockwise direction, as need for such adjustment dictates, as will hereinafter appear.

A collet adjustment pin 144 is of a length and diameter so as to be slidingly receivable within collet adjustment pin opening 142 in collet adjustment pin block 140 and has a forwardmost end portion of suitable diameter and length so as to be slidingly receivable within the coaxially-aligned spacer opening 124 in the contiguous and forwardly-disposed collet adjustment disc 120.

Collet adjustment pin 144 is releasably securable relative to collet adjustment pin block 140 and the thereby interengaged collet adjustment disc or collar 120 as by a radially-disposed set screw 146 threadedly receivable in a suitable opening extending inwardly from the outer peripheral surface of collet adjustment pin block 140 and intersecting collet adjustment pin opening 142, the inner end of set screw 146 being seatable in an aligned annular recess or groove 145 provided in the peripheral wall of said collet adjustment pin.

Experience will dictate a periodic necessity for the adjustment of the collet. Accordingly, collet adjustment disc 120 is provided with said multiplicity of spacer openings 124 for effectuating variations in the collet tension. Set screw 146 will be rotated so as to withdraw it from its seat in recess 145 of collet adjustment pin 144 to permit withdrawal of said collet adjustment pin rearwardly and to achieve disengagement of said collet adjustment pin and collet adjustment disc 120 following which said collet adjustment disc will be manually rotated to a desired new position with collet adjustment pin opening 142 being aligned coaxially with another spacer opening 124 of collet adjustment disc 120, whereby said collet adjustment pin will be inserted into the newly-aligned spacer opening and said set screw will be threaded inwardly again so as to reseat in the annular recess of the pin to secure same during operational use.

The manually-induced rotative movement of said collet adjustment pin block 140 serves to move collet draw bar 20, with which it is threadedly engaged, forwardly or rearwardly, according to whether said motion is clockwise, or counterclockwise, all whereby a desired degree of tightness or looseness of the collet 23 is attained so as best to serve the particular requirements of the stock being worked at a given moment.

So tensioned to desired degree, the forward or rearward unitary rectilinear motion of the entire subgroup, constituted by collet draw bar 20, collet adjustment pin block 140, collet adjusting pin 144, collet adjustment disc 120, and collet adjusting sleeve 40, is controlled.

A spring-loaded collet opening bumper block 150, of generally rectangular configuration, is provided with an annular horizontally-extending central opening extending therethrough to allow its telescopic or sleeved engagement upon collet adjustment pin block 140 and confrontation of its forward end face with rearward face 25 of collet assembly bracket 10 and to be stationarily secured, as by bolts 156 or the like, to said collet assembly bracket 10.

Collet-opening bumper block 150 is provided with a plurality of forwardly-facing horizontally-disposed cylindrical thrust spring recesses 158, arranged circumferentially around said central opening and arranged equi-angularly as to each other, each said thrust spring recess being adapted nestably to receive the rearmost portion of a horizontally-disposed collet thrust spring 160.

Operationally, said thrust springs 160 are so positioned that their forwardmost vertically-disposed end faces bear against the rearward face of left-hand collet closing cam thrust plate 130 wherewith to aid in effecting the thrusting open of the collet 23 as the collet opening phase of the operational cycle ensues following the release of left and right hand collet closing cams 60 and 70 from their interlocked relationship.

It will be understood that collet adjustment pin block 140, concentrically related to and extending through collet opening bumper block 150, is so configured as to allow a sufficient clearance wherewith to be freely slidable axially relative thereto and in concert not only with collet adjusting pin 144, held fast relative thereto as by set screw 146, but also with collet adjustment disc 120 threadedly interengaged with collet adjusting sleeve 40 held fast to collet draw bar 20, in a retrograde or forward movement according to each closing or opening of the collet 23.

It will be further understood that as said subgroup (collet 23, collet draw bar 20, collet adjusting sleeve 40, collet adjustment disc 120, and collet adjustment pin block 140) is thrust rearwardly, such thrust is absorbed by a plurality of thrust springs disposed rearwardly thereof, as will appear.

A tapped bore extends inwardly from the top planar surface of collet-opening bumper block 150 for supporting a vertically-extending threaded post 170, and the forward end of a horizontally-disposed rearwardly-extending coil spring 172 is engaged with the external portion of said post. Said coil spring extends rearwardly toward another post (not shown) and to which its rearward end is attached. By the means thereof, feed tube 30 may be motivated forwardly, when the collet is open.

A ringlike draw bar bearing adapter 154 has a central opening therethrough and is threadedly sleeved upon the rearward extremity of collet draw bar 20 for functioning as a locking nut for collet adjustment pin block 140 by being brought to bear against the rearward end face thereof.

A bearing 180 has an inner race sleeved upon an outer or peripherally-arranged forwardly-facing recess 155 of draw bar bearing adapter 154 and is nested within a forwardly-facing bearing chamber 184 of a rectangularly-configured alignment block 186, the forwardmost end portion of which is sleeved over collect adjustment pin block 140 in manner to enclose the rearward extremity thereof.

Said alignment block is secured to collect opening bumper block 150 as by bolts 187 or the like.

Said alignment block 186 is provided with a plurality of cooperant alignment block thrust springs 192 suitably nested in thrust spring openings provided therefor so as to allow the forward ends thereof to bear against a ringlike bumper spring pad 194 nested within bearing chamber 184 adjacent the bottom or innermost wall thereof and having a forward face abutting the rearmost end face of draw bar bearing adapter 154.

Said alignment block thrust springs 192 serve as a vibration damper so as to receive and cushion the thrust of the rearwardly moving components in their retrograde collet closing stroke induced by the rapid reciprocation of said components at the high speed of operation envisioned herewith and also aid in the collet-opening function coordinately with collet thrust springs 160 in collet-opening bumper block 150 to restore the collet to its forward position.

Figure 2:
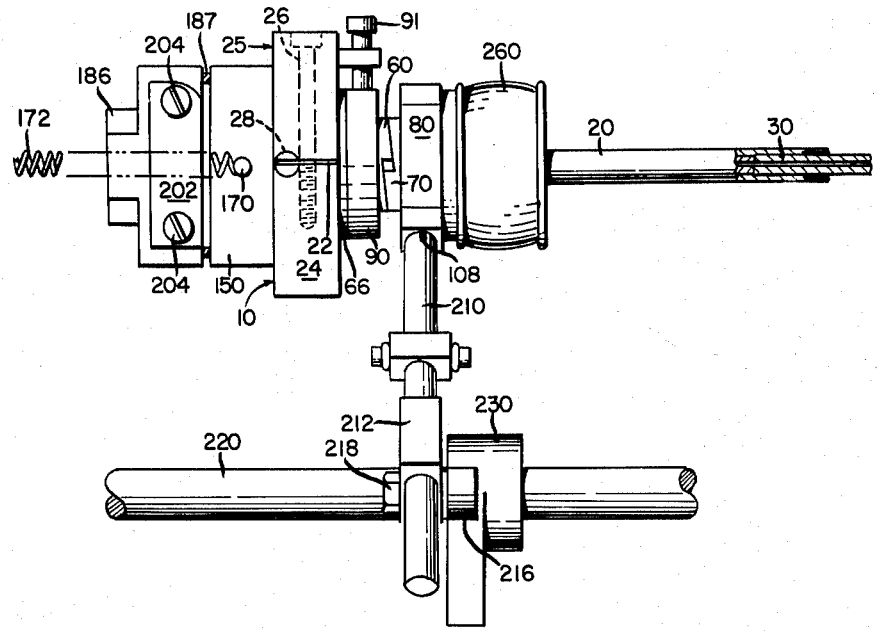
FIG. 2 is a fragmentary top plan view, on a reduced scale, showing certain of the components of the assemblage of the invention in cooperative interengaging relationship with a conventionalized cam shaft of an automatic screw machine.
Figure 3:
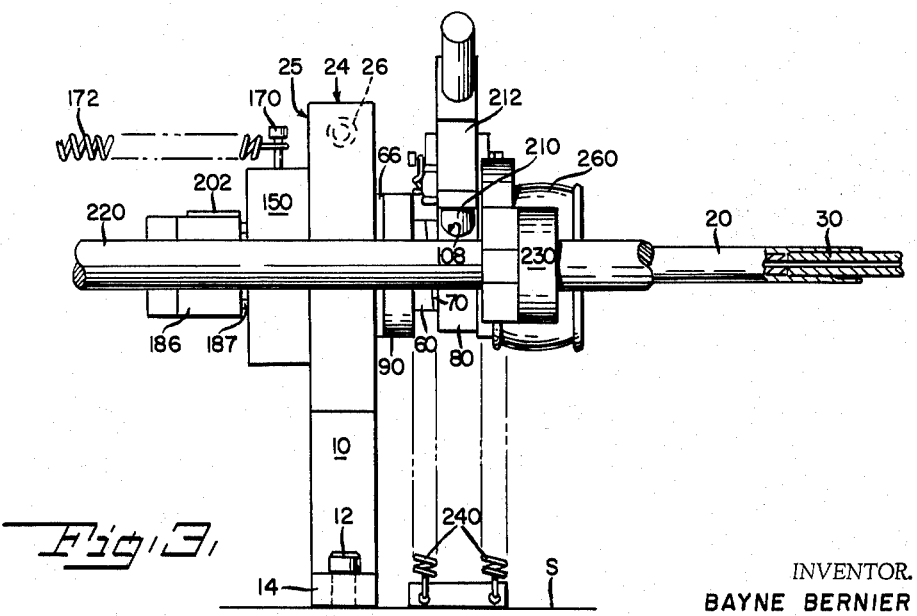
FIG. 3 is a fragmentary side elevational view of the components shown in FIG. 2 taken from a horizontal plane below the horizontal plane of the said conventionalized cam shaft.
Figure 4:
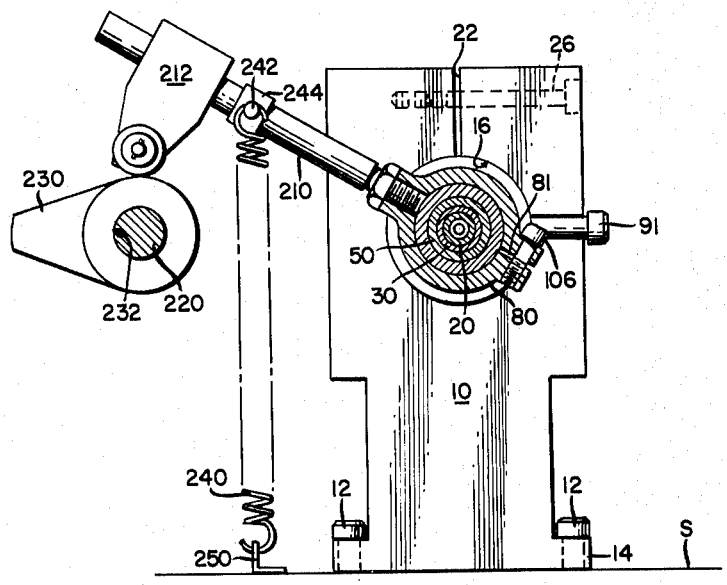
FIG. 4 is a transverse vertical sectional view taken on a line forwardly of the collet opening cam and looking toward the rear or left-hand end of the assemblage, as viewed in FIGS. 1–3.
Figures 7, 8:
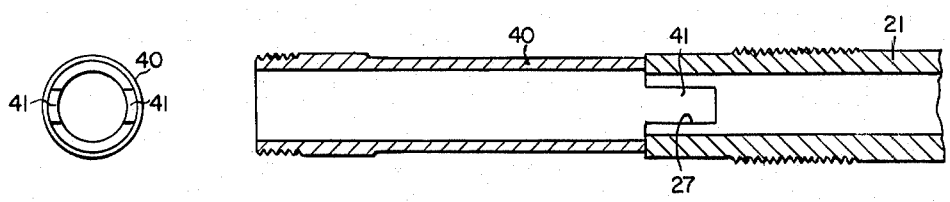
FIG. 7 is a fragmentary longitudinal vertical sectional view showing the interrelationship of the collet adjusting sleeve and spindle of the assemblage.
FIG. 8 is an end elevational view of the collet adjusting sleeve of FIG. 7 as seen from the right hand end thereof.
Figure 5:
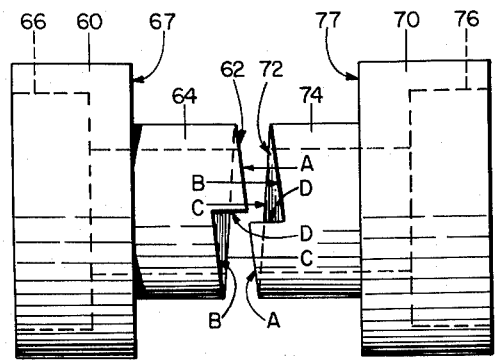
FIG. 5 is a top plan view of the left-hand and right-hand collet closing cams of the assemblage showing their interrelationship in the opened or non-interlocking and non-operative position.
Figure 6:
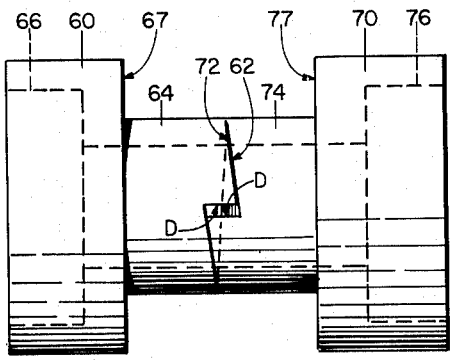
FIG. 6 is a view, similar to FIG. 5, showing the interrelationship of said cams in the closed or interlocking and operative collet closed position.

An access opening 200 through the top planar wall 188 of alignment block 186 leads to bearing chamber 184 therewithin, and may be covered as by a collet adjustment cover 202 secured thereto as by bolts 204 or the like, as shown in FIGS. 2 and 3.

Said access opening 200 allows ready access to collet adjustment pin block 140 and adjusting pin 144 so as to allow unlocking, rotation and locking of the collet adjustment pin block according to the tension desired to be placed upon collet draw bar 20.

Said collet opening yoke 80, aforedescribed as being concentrically mounted upon and releasably secured to hub 74 of right-hand collet closing cam 70 for rotating same therewith and further described as having a radially-extending yoke pin opening 108 extending threthrough at one side thereof, is adapted to receive, in said yoke pin opening, the inner extremity of an outwradly-projecting elongated yoke pin 210, which yoke pin projects transversely to and at one side of the main axis of the apparatus toward a conventional screw machine cam shaft 220 disposed along an axis parallel to said main axis.

Said yoke pin 210 has a free outer extremity adapted to receive thereon a generally rectangularly-configured cam follower bracket 212 which is adjustably secured to said yoke pin as by a sliding fit and which supports a transversely-extending cam follower 216 as by a nut 218 or equivalent.

A collet opening cam 230 has a transverse cam shaft opening 232 allowing its pinning to cam shaft 220 at a strategic location therealong, whereby it may, upon rotation from its most downwardly extending position to its most upwardly extending position, impart a following action to cam follower 216 for effectuating the opening of the collet.

With collet opening cam continuing its rotative movement from the said most upwardly extending position, cam follower 216 rides over the high point of collet opening cam 230, so that yoke pin 210 is pivoted downwardly in a downward collet cam closing direction by the compressive action of one or more springs 240 secured at their upper ends to transversely-extending pins 242 extending outwardly from opposite sides of a spring tension block 244 slidably mounted upon and intermediate the length of yoke pin 210 and secured at their lower ends to a bracket 250 suitably secured to support S.

Cam shaft 220, collet opening cam 230, yoke pin 210, spring tension block 244, cam follower bracket 212, cam follower 216, and collet opening yoke 80 thus will be observed to constitute a train of interacting components for effectuating the rotation of right-hand collet closing cam 70 into an unlocking or disengaging position relative to left-hand collet closing cam 60 as determined and controlled by the rotative movement of cam shaft 220, thereby to allow the collet opening function.

In operation, the apparatus is started, for example, by shifting the belt entrained around spindle driving pulley 260 on to an overhead running pulley or to a motor-driven pulley mounted adjacent the machine, whereupon motion is imparted to the spindle 21 and thence to collet draw bar 20 wherefore the collet 23, collet draw bar, feed tube 30, and collet adjusting sleeve 40 are all rotating at a high rotational speed, with the collet 23 held forwardly of the spindle head 21' wherefore the collet jaws are distented preparatory to the feeding movement of the work therethrough.

Rotation is also imparted to cam shaft 220 from the same or from a different source of power, with collet opening cam 230 being rotated therewith.

With the jaws of the collet 23 open as the collet is disposed forwardly of the spindle head, feed tube 30 is urged forwardly by spring 172 to advance the work forwardly and through the collet jaws until the forwardmost end of the work is brought into confronation with the usual gauge or stop means (not shown) where it is held yieldably thereagainst.

Right and left hand collet closing cams are then moved into interlocked position so as to draw collet draw bar 20 rearwardly and concomitantly the collet 23 wherefore the tapered head of the collet impinges the seat of the conical recess of the spindle head so that the jaws of the collet are moved into closing or clamping position on the work.

The train involved in the collet closing process is now described.

Collet opening cam 230, strategically positioned upon cam shaft 220, is rotated thereby in collet closing direction from uppermost position toward lowermost position so as to allow a downward pivoting stroke of yoke pin 210 as influenced by the compressive force of springs 240 and to effect therewith corresponding incremental rotative movements in collet closing directions of the interengaged collet opening yoke 80 and right-hand collet closing cam 70.

Rotative movement of right-hand collet closing cam 70 is such as to force it to be cammed into interlocked relationship with left-hand collet closing cam 60, which camming results in the simultaneous rotation of right-hand collet closing cam 70 and a determined degree of rearward rectilinear movement of left-hand collet closing cam 60, any freedom of rotative movement being denied the latter by locking ring 90.

As left-hand collet closing cam 60 is motivated rearwardly, bearing 110 housed therewithin is motivated accordingly so as to bear upon collet adjustment disc 120 threadedly mounted upon collet adjustment sleeve 40, thereby to thrust the collet adjustment sleeve rectilinearly rearwardly in the same degree of movement, and to thrust collet draw bar 20 and collet 23 therewith so as to cause the tapered head of the collet to embrace the conical recess of the spindle head, thereby to achieve collet closing.

Such degree of movement of collet adjustment sleeve 40 is incremental so that, while the sleeve is motivated away from and relative to spindle 21 with which it is matched, the movement is not of such dimension as completely to disengage the key of the sleeve from the keyway of the spindle.

And during this interval, feed tube 30 will be understood not to move correspondingly with the collet adjustment sleeve, collet draw bar and collet.

Immediately following the closing of the collet jaws, a feed tube retracting means is rendered operative to draw the feed tube rearwardly within the collet draw bar and along and relative to the clamped-in-position work for obtaining a new grip thereon.

Simultaneously, other means (not shown) will move the cutting tool or tools into operating position relative to the work, and still other means will retract the guage or stop means so as to avoid interference with the functioning of the cutting tools.

As soon as the work is turned and/or cut off, as the case may be, the cutting tool or tools are retracted and the gauge or stop means is moved into its operative position for limiting the next advancement of the work.

While this invention is primarily directed to the collet closing features of the apparatus shown and described, the train involved in the collet opening function is now described.

As collet opening cam 230 is successively rotated upon cam shaft 220 in collet opening direction from lowermost to uppermost positions, a following action is accordingly imparted to cam follower 216 so as to cause yoke pin 210 to pivot upwardly in its complemental collet opening direction and against the compressive action of springs 240, thereby to effect incremental rotative movements in unison of collet opening yoke 80 and right-hand collet closing cam 70 engaged therewith likewise in collet opening directions, reversely to the collet closing directions previously described.

This rotative movement of right-hand collet closing cam 70 is such as to allow a rectilinearly forwardly movement thereof and further to allow left-hand collet closing cam 60 to be motivated rectilinearly forwardly to its forwardmost position as induced by the forward thrusting action of thrust springs 160 in bumper block 150.

The unlocking of the interlocked left-hand and right-hand collet closing cams releases the collet draw bar to allow it to be advanced forwardly by the timed functioning of the collet opening subgroup and the cooperating force of thrust springs 192 in collet opening bumper block 150, all so as to release the collet jaws for the next succeeding forward movement of the work relative to the machine and the next subsequent clamping and cutting steps.

I claim:

1. In a machine for feeding bar stock longitudinally and incorporating a draw bar spring type work-gripping collet for intermittently holding the stock in a selected position by a closing of the gripping jaws of the collet upon the stock and releasing the stock by an opening of the gripping jaws according to longitudinal reciprocating movement of the collet relative to a rotatively-driven spindle with the collet being cooperant with a collet draw bar rigidly fixed thereto and supported within the spindle and with the rotative movement of the spindle being unisonly imparted to the collet and collet draw bar and with a work advancing feed tube reciprocable longitudinally in and relative to the collet draw bar, the improvement in a cam-operated collet closing assembly for drawing the collet rearwardly relative to the axis of the spindle for the closing of the gripping jaws and comprising, a collet adjusting sleeve sleeved upon and secured to the collet draw bar and reciprocable therewith while being continuously keyed to the spindle for receiving driving power therefrom, a collet cam sleeve sleeved about said collet adjusting sleeve, a first collet closing cam sleeved upon said collet cam sleeve, a second collet closing cam sleeved upon said collet cam sleeve in coaxial arrangement relative to said first collet closing cam, and means for rotating said second collet closing cam into cammed relationship with said first collet closing cam for imparting a rectilinearly rearward movement of said first collet closing cam relative to said collet cam sleeve with a concomitant rectilinearly rearward movement of said collet adjustment sleeve and the collet draw bar and collet interconnected therewith relative to the spindle.

2. In the cam-operated collet closing assembly as set forth in claim 1, including, a collet tension adjustment disc threadedly engaged with said collet adjusting sleeve and having a plurality of circumferentially arranged spacer opening therethrough, a first collet closing cam throus plate sleeved upon said collet adjustment disc, a rotatable collet adjustment pin block threadedly engaged and coaxially aligned with the collet draw bar and having an adjustment pin opening extending through and being selectively coaxially-alignable in seriatim with each of the spacer openings of said collet tension adjustment disc, and a collet adjustment pin being slidingly receivable within the adjustment pin opening of said collet adjustment pin block and the selected coaxially-aligned spacer opening of said collet adjustment disc.

References Cited by the Examiner

UNITED STATES PATENTS

| | | | |
|---|---|---|---|
| 2,310,259 | 2/1943 | Ruppel | 279—1.4 |
| 2,375,734 | 5/1945 | Montgomery | 279—1.4 |
| 2,443,220 | 6/1948 | Bechler | 279—1.4 |
| 2,491,358 | 12/1949 | Bogart | 279—1.4 |
| 2,917,313 | 12/1959 | Anderson | 279—1 |

ROBERT C. RIORDON, *Primary Examiner.*